United States Patent
Maenz

(10) Patent No.: US 8,602,356 B2
(45) Date of Patent: Dec. 10, 2013

(54) FRAMEWORK WING BOX FOR A WING

(75) Inventor: Christian Maenz, Hamburg (DE)

(73) Assignee: Airbus Operations GmbH (DE)

( * ) Notice: Subject to any disclaimer, the term of this patent is extended or adjusted under 35 U.S.C. 154(b) by 801 days.

(21) Appl. No.: 11/990,578

(22) PCT Filed: Aug. 17, 2006

(86) PCT No.: PCT/EP2006/008132
§ 371 (c)(1),
(2), (4) Date: Jul. 10, 2009

(87) PCT Pub. No.: WO2007/020094
PCT Pub. Date: Feb. 22, 2007

(65) Prior Publication Data
US 2009/0294590 A1 Dec. 3, 2009

Related U.S. Application Data

(60) Provisional application No. 60/709,145, filed on Aug. 17, 2005.

(30) Foreign Application Priority Data

Aug. 17, 2005 (DE) .......................... 10 2005 038 851

(51) Int. Cl.
*B64C 3/22* (2006.01)
(52) U.S. Cl.
USPC ..................................... 244/123.4; 244/123.1
(58) Field of Classification Search
USPC ........ 244/123.1, 123.12, 123.2, 123.4, 87, 91
See application file for complete search history.

(56) References Cited

U.S. PATENT DOCUMENTS

| | | | |
|---|---|---|---|
| 1,545,129 A * | 7/1925 | Cook, Jr. ...................... | 52/653.2 |
| 1,555,409 A | 9/1925 | Gilmore | |
| 1,810,762 A * | 6/1931 | Gish .......................... | 244/117 R |
| 1,842,736 A | 1/1932 | Stout | |
| 1,988,079 A * | 1/1935 | Henrichsen ................. | 244/123.4 |
| 2,122,709 A * | 7/1938 | Barkley ..................... | 244/123.4 |
| 2,791,386 A * | 5/1957 | Kastan ....................... | 244/123.8 |
| 2,941,760 A * | 6/1960 | Griffith ........................ | 244/119 |
| 3,666,211 A * | 5/1972 | Cathers et al. .................. | 244/54 |
| 4,308,699 A * | 1/1982 | Slysh .............................. | 52/108 |
| 4,332,501 A * | 6/1982 | Slysh ............................ | 403/219 |
| 4,448,372 A * | 5/1984 | Larson ............................ | 244/87 |
| 4,667,905 A * | 5/1987 | Hamm et al. ............ | 244/123.13 |
| 5,496,002 A * | 3/1996 | Schutze ..................... | 244/123.3 |
| 5,501,414 A | 3/1996 | Bauer et al. | |
| 6,237,873 B1 | 5/2001 | Amaoka et al. | |

(Continued)

FOREIGN PATENT DOCUMENTS

BE 434808 6/1939
CH 93735 3/1922

(Continued)

OTHER PUBLICATIONS

Office Action from Japanese Application No. 2008-526447, dated Oct. 11, 2011.

(Continued)

*Primary Examiner* — Joseph W Sanderson
(74) *Attorney, Agent, or Firm* — Lerner, David, Littenberg, Krumholz & Mentlik, LLP

(57) ABSTRACT

A wing box for an aircraft wing with a framework and a first shell. The framework is connected to the first shell such that a load acting on the first shell can be transferred by the framework.

4 Claims, 8 Drawing Sheets

(56) References Cited

U.S. PATENT DOCUMENTS

| | | | |
|---|---|---|---|
| 6,655,633 B1 * | 12/2003 | Chapman, Jr. | 244/123.9 |
| 7,025,305 B2 * | 4/2006 | Folkesson et al. | 244/117 R |
| 7,063,763 B2 * | 6/2006 | Chapman, Jr. | 156/175 |
| 7,597,287 B2 * | 10/2009 | Gay | 244/123.4 |
| 7,669,799 B2 * | 3/2010 | Elzey et al. | 244/123.12 |
| 8,205,834 B2 * | 6/2012 | Maenz | 244/123.4 |
| 2003/0146346 A1 * | 8/2003 | Chapman, Jr. | 244/123 |
| 2003/0173460 A1 * | 9/2003 | Chapman, Jr. | 244/123 |
| 2010/0170995 A1 * | 7/2010 | Maenz | 244/131 |

FOREIGN PATENT DOCUMENTS

| | | |
|---|---|---|
| DE | 337522 | 6/1921 |
| DE | 343385 | 11/1921 |
| DE | 515645 | 1/1931 |
| DE | 671453 | 2/1939 |
| DE | 4315600 | 11/1994 |
| DE | 69911507 T2 | 6/2004 |
| GB | 148890 | 5/1921 |
| GB | 148891 | 9/1921 |
| GB | 333833 | 8/1930 |
| JP | 41453 | 1/1922 |
| JP | 105904 | 4/1934 |
| RU | 2191137 C2 | 10/2002 |
| WO | WO 02098734 A1 * | 12/2002 |

OTHER PUBLICATIONS

International Search Report, PCT/EP2006/008132.

* cited by examiner

FRAMEWORK WING BOX FOR A WING

This application claims the benefit of the filing date of U.S. Provisional Patent Application No. 60/709,145 filed Aug. 17, 2005 and of German Patent Application No. 10 2005 038 851.5 filed Aug. 17, 2005, the disclosures of which are hereby incorporated herein by reference.

The present invention generally relates to the technical field of statics. In particular, the present invention relates to a wing box for an aircraft wing, the use of a framework as a stiffening device of a wing box of an aircraft wing, and to a method of force transfer in a wing box of an aircraft wing.

In aircraft, wings comprise a leading-edge region, a wing box, an end box and a control surface region. The leading-edge region adapts the aircraft wing to the aerodynamics and serves to reduce the aerodynamic drag of the aircraft wing. The wing box supports the wing structure and absorbs the loads caused by differences in pressure or by load changes. The end region contains the hydraulics responsible for moving the control surfaces. The control surface region comprises the rudder as a control component for changing direction.

Examples of such wings, designed as spar boxes, in an aircraft include airfoils, elevators and vertical tails. Known designs of a wing box comprise shells that are reinforced by spars, ribs and stringers. With these components local stiffening of the wing boxes is to be achieved. However, in order to absorb the very substantial forces that act on the wing boxes, the spars, ribs and stringers have to be solid, which sally causes them to be heavy.

In order to absorb very substantial forces, usually many large components are necessary. On the one hand this results in disadvantages in the case of production errors because the large components have to be repaired at considerable effort.

On the other hand, in particular in the case of ribs, it is however not possible to transfer introduced loads, such as for example loads that result from pressure forces or tensile forces during flight manoeuvres of an aircraft, by the shortest route to the fuselage connection.

From printed publication DE 699 11 507 T2 a wing structure made of fibre reinforced composite material with a multi-spar design is known.

It is an object of the present invention to provide an improved aircraft wing.

According to exemplary embodiments, a wing box for an aircraft wing, the use of a framework as a stiffening device for a wing box of an aircraft wing, and a method for force transfer in a wing box of an aircraft wing with the features of the independent claims are provided.

In the context of the present invention, the term "force" refers to both pressure force and tensile force.

According to an exemplary embodiment of the present invention, a wing box for an aircraft wing is provided. The wing box comprises at least one first shell and a framework. The framework is connected to the at least one first shell, so that a load that acts on the at least one first shell, can be transferred by way of the framework. Normally, the design of a wing box is symmetrical.

The framework can be a load-bearing structure which can be entirely or partly encased by the at least one first shell. Normally, the first shell is a continuous rather flat element. The first shell can, however, also comprise several components that are non-continuous, which components are of sheet-like nature. In this case, the non-continuous components can cover only parts of the framework.

Areas or planes that are connected to the framework are to be allocated to the first shell. For example, a first shell can comprise two opposing half shells, wherein the half shells can be separated by the framework.

The framework can comprise junction points or node points at which individual bar elements are joined. Bar elements are well known from framework structures and are to be interpreted in this sense in the context of the present invention.

By means of the framework, shapes, such as for example the shape of an aircraft wing, can be modelled. To this effect, the wing shape is approximated with the framework, in the way known from wire frame models. With a framework, it is possible to design not only a wing box, but also the entire aircraft wing, including the leading-edge region and end region.

In other words, the contour shape of the wing or of the wing box may be modelled by junction elements or node elements that delimit the framework. Shell elements, for example a skin, can then be stretched over the wire frame model, wherein the shells can be connected to the junction elements or node elements. In this way, a model of the shape of the aircraft wing can be produced.

The shell can comprise a sheet-like structure so that forces caused by airflows can be absorbed by the shell and transferred to the framework.

The shell can be made of metal, of a fibre reinforced composite material such as for example carbon-fibre reinforced plastic, glass-fibre reinforced plastic (CFK or GFK) or some other material commonly used in aircraft engineering. The shell forms a surface that can carry out the function of the respective wing. Essentially, a wing is used for separating air flows. Due to the wing shape, the type of the airflow around the aircraft wing can be determined. The surfaces exposed to the airflow can influence the flight behaviour of the aircraft.

Airfoils can comprise a curved shape. The surfaces of the shell separate an air stream that flows past the wing. The shell of an airfoil can comprise a top side and a bottom side.

The path along which air flows when the aircraft is in motion, along the top side of the airfoil, which top side usually faces away from the ground, can be longer than the path along which air flows along the bottom side of the wing, which bottom side usually faces the ground. Due to the longer path of the air flowing past at the top side, suction forces arise on the airfoil in the direction of the shell side at the top of the airfoil. On the opposite side, pressure can arise. Due to the difference between the suction and the pressure, the aircraft can be held in the air during flight. However, in this process, loads can act on the airfoil and/or the wing.

The situation is similar in the case of a vertical tail unit of an aircraft. A vertical tail unit separates the air into two parallel air streams, each of which flows past one side of the vertical tail unit. As the air flows past, both air streams travel the same distance. During straight-ahead flight essentially no forces act on the vertical tail unit perpendicular to the direction of airflow.

The end of the vertical tail unit can comprise a control surface or rudder. The rudder can be moved to either side of the vertical tail unit. As the rudder is deflected, the path along which the air has to travel becomes shorter on the side into which the rudder is deflected. This results in pressure acting on the respective shell. On the opposite side, on which the path of the flowing air becomes longer as a result of the rudder deflection, suction forces arise. The differences in pressure on the opposite sides of the vertical tail unit ensures that the aircraft carries out the corresponding flight movement. Thus, loads in the form of transverse loads act on the vertical tail unit, in particular on the wing box of the vertical tail unit.

The framework, which provides support to the shell, can support a force that acts on the surface of the shell. It is thus not the shell alone that faces the force; instead, a large part of the force can be absorbed by and transferred to the support structure, i.e. the framework. A force can be caused by a pressure load or tensile load acting on the shell, and also by a moment acting on the shell. In the case of aircraft wings the above-mentioned differences in pressure can cause forces or moments on opposite wing shells.

A framework in an aircraft wing or in a wing box of a wing can allow for a simple design of the shells. The shells no longer have to absorb the forces acting on them on their own; instead, the shells are supported by the framework in absorbing and transferring forces.

According to another aspect of the present invention, the use of a framework as a stiffening device for an aircraft wing is provided. In particular, the use of a framework as a stiffening device for a wing box of an aircraft wing is provided.

A framework comprises support components that can be made from various materials and that can comprise various shapes. The cross-sectional shape and the material of the support component can influence individual support components' resistance to pressure or tension. The force distribution within the framework can be influenced by the structure of the framework, i.e. the interaction among support components. Consequently, as far as the support components are concerned, the framework can be designed in almost any way desired.

This means that the material used, for example carbon-fibre reinforced plastic (CFK or GFK) or metal, or the cross-sectional shape of individual support components to be used, for example round cross sections or rectangular cross sections, can be freely selected. Only requirements relating to the weight and stability are to be taken into account in the selection. The supporting function can be ensured by means of the geometric arrangement of the framework.

It can more easily be possible to invest the expense of reinforcing a wing in the framework than in the shell. In contrast to shells that have to absorb and transfer all the forces, the shell of an aircraft wing comprising a framework can be of simpler design. Support spars, ribs or stringers for reinforcing a shell can be dimensioned for lighter loads, or they can be omitted altogether.

Furthermore, according to another exemplary embodiment of the present invention, a method of force transfer in a wing box of an aircraft wing is provided. First of all a framework is connected to a first shell, wherein a load can be absorbed by the first shell. By means of the framework connected to the shell the absorbed load can be transferred.

The load can be any arbitrary force that acts on a wing. For example weight forces, centrifugal forces or transverse forces, which forces can, for example, be caused by a gust of wind or by an airflow, are imaginable.

In the context of the present invention, the term "wing" refers to any type of wing. In particular, the term refers to an aircraft wing, wherein the term "aircraft wing" is to be interpreted in its widest sense. In particular, the term "aircraft wing" refers to airfoils, horizontal tail units, and vertical tail units. As an example of an aircraft wing, the design of a vertical tail unit is provided. A vertical tail unit comprises a leading-edge region, a load-bearing wing box, an end box, as well as a control surface such as a rudder.

According to a further exemplary embodiment of the present invention, a wing box with a second shell is provided, wherein the second shell is spaced apart from the first shell.

The space and distance between the first shell and the second shell can, for example, be created by a U-profile to which the first and the second shell are connected. The U-profile can extend between the first and the second shell, and the shape of the second shell can correspond to the shape of the first shell. The second shell can be enveloped by the first shell.

However, the shape of the second shell can also correspond to part of the shape of the first shell. The second shell can also be connected to junction points or node points of the framework.

By the distance between the first and the second shell the two shells can mutually support each other, thus improving the stability of the wing box.

According to a further exemplary embodiment of the present invention, the first shell can carry out the function of an exterior shell. The second shell can then be an interior shell.

An exterior shell can be directly exposed to environmental influences such as rain or wind. The interior shell can be protected by the exterior shell in that the interior shell is enclosed by the exterior shell. Consequently, the interior shell can be used for stiffening.

Since pressure loads on lateral surfaces of a vertical tail unit are often very high only locally, for example in the root region of an aircraft wing, it may be advantageous if the interior shell is arranged only in selected regions so that the interior shell extends only in selected parts in relation to the exterior shell. Thus, generally, it will not be necessary to provide a dual-shell lateral surface construction in the region of a wingtip, where bending loads are only very light.

According to a further exemplary embodiment of the present invention, the framework that supports the wing box can be connected to a bottom region. Thus, the force absorbed by the framework can be transferred to the bottom region, and the vertical tail unit can be attached to the fuselage of an aircraft.

A transverse force that is absorbed by the lateral shells and has been transferred at least partially to the framework, can be introduced in the fuselage region of an aircraft or the bottom region of the aircraft fuselage. In the regions of attachment of the framework to the fuselage region the fuselage region can advantageously be designed for absorbing tensile forces and pressure forces. In this way very considerable forces can be transferred. In conjunction with dual-wall shells, stable wings can be designed in this way.

According to a further aspect of the present invention, load transfer takes place in a straight line to the bottom region, in particular to the fuselage region. The forces can be introduced to the bottom region in the form of pressure forces or tensile forces, as a result of which shearing forces and moments are essentially prevented.

A framework comprises bar elements and junction elements or node elements. The bar elements are connected to each other at the junction elements or node elements. In this context any reference to a straight line means that the forces propagate along the bar elements. In particular no transfer of moments takes place. The bottom region can thus primarily be dimensioned to withstand pressure forces and tensile forces, as a result of which the design of the aircraft can be simplified. Simplification can consist of only selected attachment regions of the fuselage region having to be reinforced.

According to a further aspect of the present invention the framework can be connected only to the at least one first shell. Hereby, it is not necessary for the framework to establish contact with the bottom region. A load acting on the framework can thus be transferred by way of the framework to the at least one first shell. The at least one first shell, in turn can be connected to a bottom region of an aircraft fuselage. In this way the load can be introduced, by the framework, into the at least one first shell, and be transferred to the fuselage region of the aircraft by way of at least one first shell.

Instead of being connected to the at least one first shell, the framework can be connected to any other shell of a wing or to a support of the shell. Advantageously, with this arrangement one or several connection element/s in the bottom region can be cut down on.

According to a further aspect of the present invention the framework is a tubular structure. In a tubular structure thin-walled tubes can be used as bar elements, which are light in weight while providing excellent stability, in particular with a large tube diameter. A large tube diameter can result in a low thickness ratio, and the thickness ratio in turn, because of an increase in the permissible stress, can result in improved material usage.

Preferably, the tubes can be made of fibre reinforced composite materials or of metal. The use of a lightweight material with good resistance to tensile forces or pressure forces can be used for a further reduction in weight.

Bar elements of a framework for an aircraft wing can be designed for typical tensile loads or pressure loads of a magnitude of 20 to 30 tonnes or of 15 to 50 tonnes for each bar element. Such loads can occur in the individual bar elements during flight manoeuvres.

Furthermore, corresponding forces can be generated as a result of gusts that act on a parked aircraft, in particular on the vertical tail unit of a parked aircraft or on an aircraft wing.

Many additional embodiments of the invention have been described with reference to the support structure. These designs also apply to the method for transferring forces in a wing box of an aircraft wing.

Below, the present invention is described in more detail with reference to the attached drawings. It shows:

Figure 1:
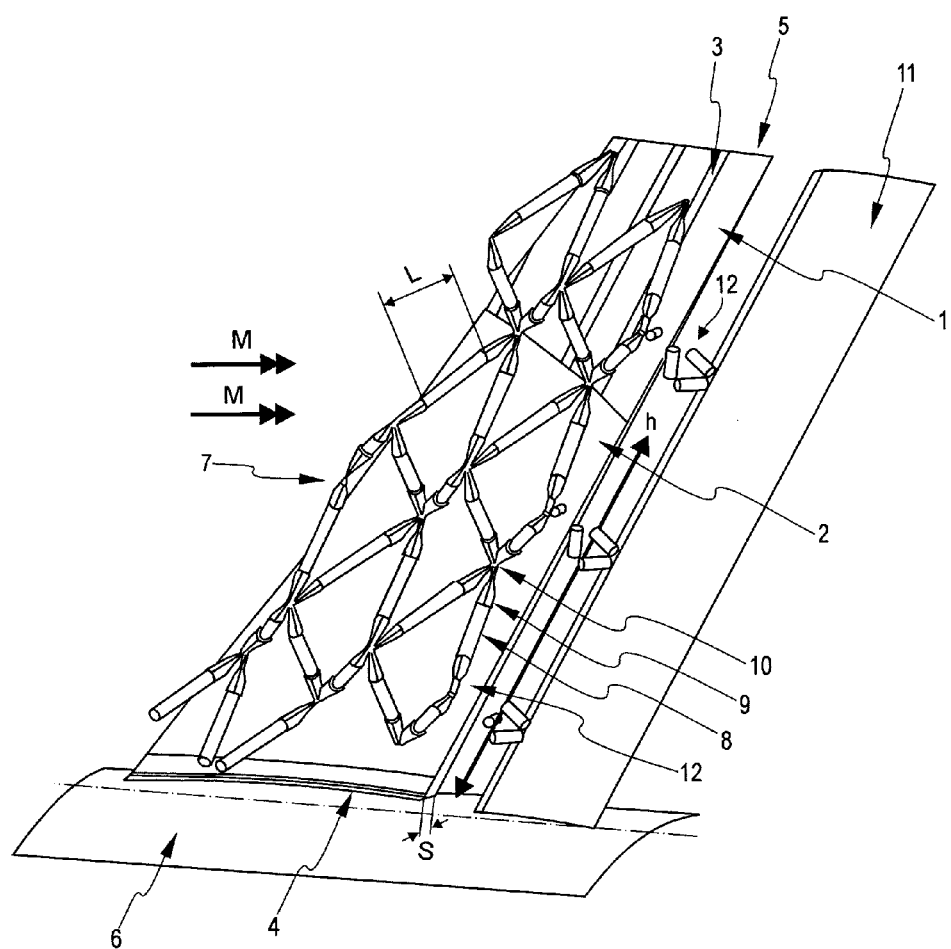
FIG. 1 shows a perspective cross sectional view of a wing with a support structure according to an exemplary embodiment of the present invention.

FIG. 1 shows a cross section of an aircraft wing, which comprises a framework 7 according to an exemplary embodiment of the present invention. The diagram shows in particular a rear (when seen from the direction of the viewer) lateral surface 5 of a wing box of an aircraft wing. The shape and orientation of the lateral surface 5 shows that it is a lateral surface 5 of a wing box for the vertical tail unit of an aircraft.

The lateral surface 5 comprises a rear (when seen from the direction of the viewer) exterior skin 1 as well as a front interior skin 2. The exterior shell or exterior skin 1 and the interior shell or interior skin 2 are spaced apart from each other at a distance s. Between the exterior shell 1 and the interior shell 2, several spacers, framework components or U-profiles 3 are arranged, which respective webs or bars have a height s. Consequently, the spacers 3 space the interior shell 2 apart from the exterior shell 1, which shells are riveted to the spacers by way of blind rivets (not shown in the figure). While attachment with the use of blind rivets can be particularly advantageous, the exterior shell 1 and the interior shell 2 can also be attached to the spacers in some other manner, for example by adhesive connections.

As is further shown in FIG. 1, the interior shell 2 does not extend over the full height of the exterior shell 1. Instead, the interior shell 2 extends only over the height h, in which exposure to torque as a result of an air load is particularly high, as is indicated by the torque-arrow symbols M. Exposure to very considerable moments applies in particular to the root region near the fuselage connection 4 of the wing box so that it is sufficient to arrange the interior skin 2 only in this region, which, depending on the type and size of the aircraft, can account for 10% to 50% of the entire wing length.

In FIG. 1 the bar or web elements of the framework 7 are composed of tubular elements 8 with connection pieces 9. FIG. 1 shows that, for further force transfer or absorption of forces, junction points or node points 10 or junction elements or node elements 10 are arranged on the respective spacers or framework profiles 3. Together with the connection pieces 9 and the tubular elements 8 they form a support structure 7 that is designed in the manner of a framework. With the structure 7 the moments are divided into tensile forces and pressure forces along the bars, and are transferred to the lateral surface of the vertical tail unit, which lateral surface (not visible in FIG. 1) is opposite the lateral surface 5. Similarly, part of the forces are fed to the connection region 4, in particular to the aircraft fuselage 6, in the form of pressure forces or tensile forces.

Advantageously, dividing the torque or forces up to the vertical tail unit not only takes place by the exterior shell 1 or the brace components 3; instead these forces are transferred by the entire support structure 7. In what is believed an advantageous manner it may thus possible to design a lateral surface 5 or framework components 3 for stiffening a wing or vertical tail unit so that the dimensions are reduced.

Since the great torque loads occur in the root region near the fuselage connection 4 of the wing box, advantageously, bar elements 8 or connection elements 9 that are produced so as to have particularly good load bearing characteristics can be used in a lower region, i.e. in a region of the support structure 7 that is near the aircraft fuselage 6. Both the interior shell 2 and the exterior shell 1 can transfer forces to the fuselage 6 by way of a bracket or angle in the region of the fuselage edge 4.

The bar elements 8, too, can be connected to the aircraft fuselage 6 for the purpose of introducing forces.

As can be taken from the figure, due to the connection of the bar elements 8, junction points or node points 10 form both on the lateral surface 5 and on the side opposite the lateral surface 5. At these locations the opposite lateral surface would be arranged, which analogous to the lateral surface 5 absorbs forces acting in the opposite direction. The bar elements 8 together with the junction elements or node elements 10 form a type of wire frame or spatial framework which is covered by the lateral surfaces 5, in particular by the interior shell 2 or exterior shell 1.

Different pressure loads on the two lateral surfaces 5 can, for example, be due to the aircraft, of which only a partial region of the fuselage 6 is shown in the diagram, carrying out flight manoeuvres. To this effect the rudder 11 would be moved both into the drawing plane and out of the drawing plane. Movement of the rudder 11 is controlled by means of control surface brackets 12. By changing the position of the rudder 11, pressure forces or suction forces are generated in a way known from a vertical tail unit. With the support structure 7 such forces can be distributed, and wing boxes of wings can be designed so as to be stable. A support structure 7 not only makes possible a stable but also a lightweight design of a wing, in particular of a vertical tail unit of an aircraft.

The support structure 7 can comprise a low thickness ratio, as a result of which it becomes possible to transfer very considerable forces. Furthermore, to fit a support structure in a wing box, corresponding tolerance compensation can take place by way of the depth to which a tubular element reaches into a connection element. By way of restraining effects a reduction in the effective buckling length of bar elements can be achieved. Furthermore, stress concentration can be prevented.

In the Airbus A 380, examples of possible frame elements 3 include the SLW wing box ribs 1-7.

Figure 2:
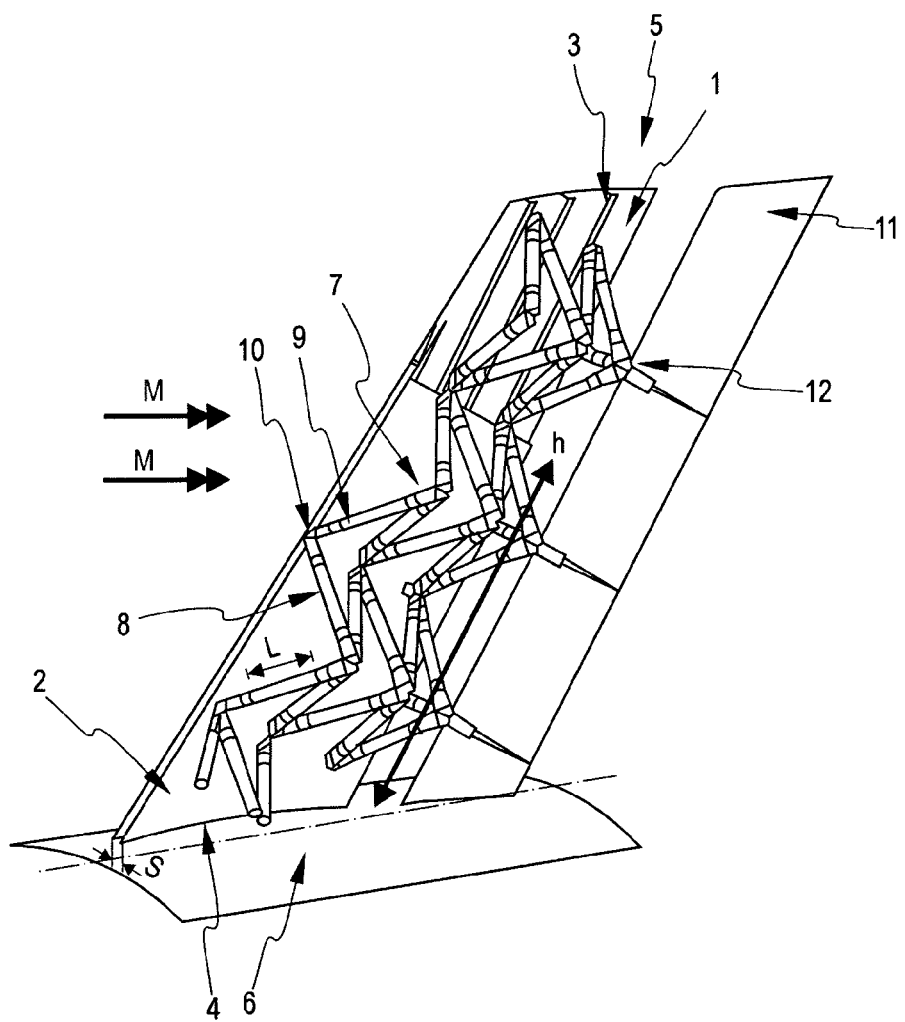
FIG. 2 shows a further perspective cross sectional view of a wing with a support structure according to an exemplary embodiment of the present invention.

FIG. 2 shows a further perspective cross sectional view of a wing comprising a support structure 7. The selected perspective shows that the end points of the tubes 8, which also comprise connection elements 9, form a plane in relation to the interior shell 2 and the exterior shell 1. With the use of corresponding junction elements or node elements 10 on these junction points or node points it is also possible to affix a lateral surface 5, if applicable with an interior shell 2 and an exterior shell 1.

Figure 3:
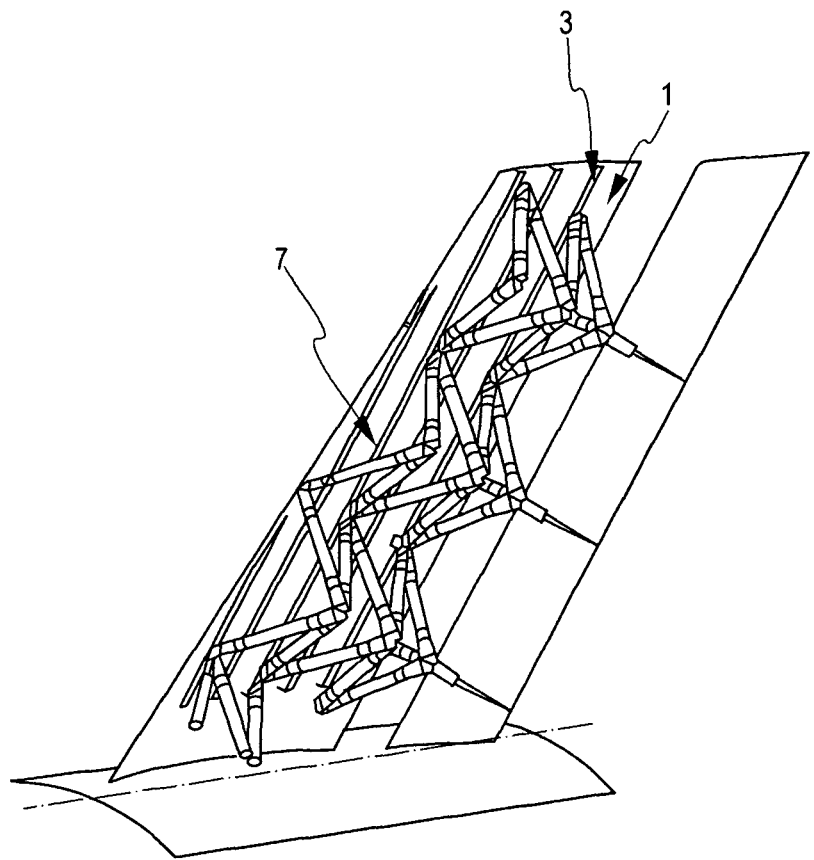
FIG. 3 shows the perspective cross sectional view of FIG. 2 without the interior shell.

FIG. 3 shows the perspective cross section of FIG. 2 without the interior shell. As can be taken from the figure, the U-profiles 3 extend across the region in FIG. 2, which is hidden by the interior shell 2.

Figure 4:
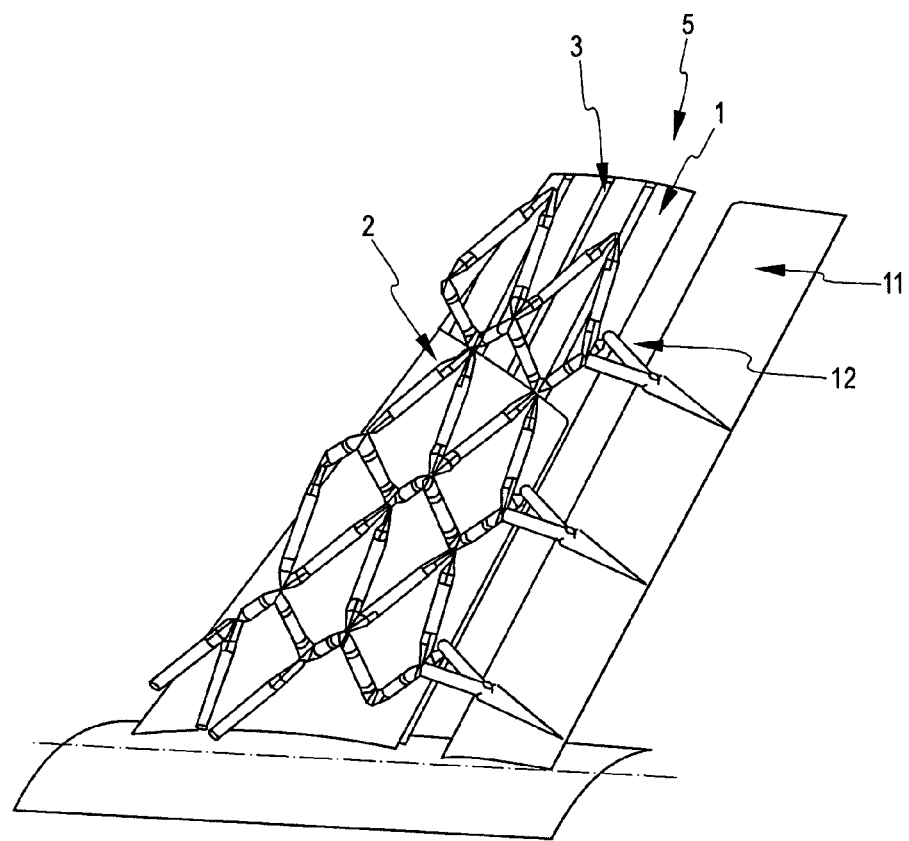
FIG. 4 shows a perspective lateral view of a wing with a support structure according to an exemplary embodiment of the present invention.
Figure 5:
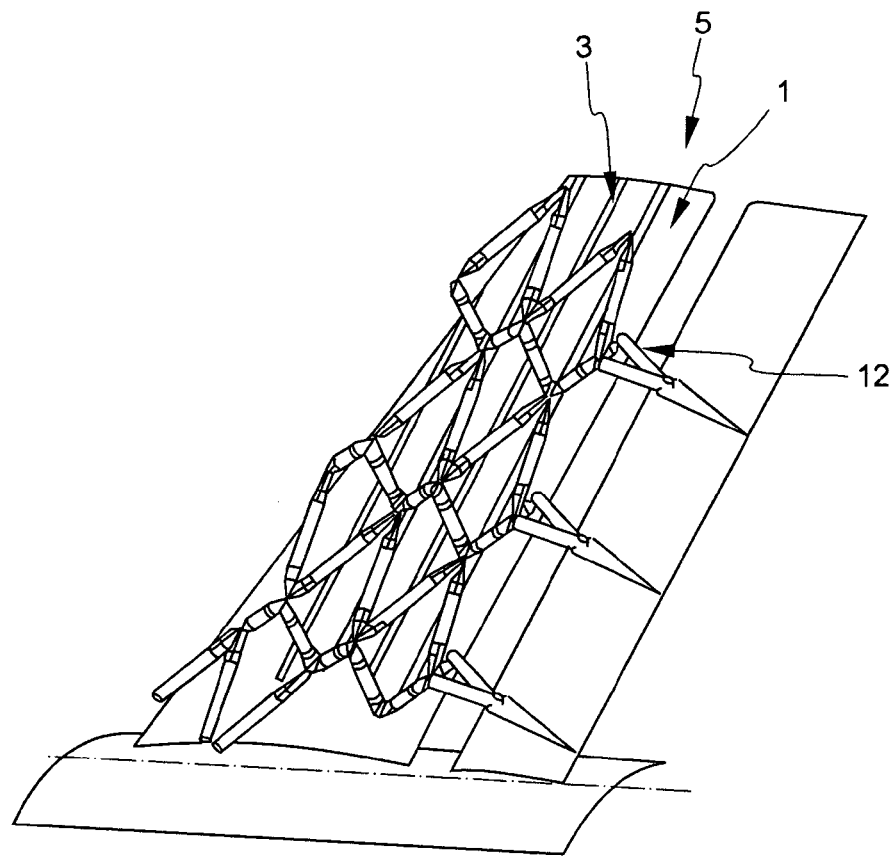
FIG. 5 shows the perspective lateral view of FIG. 4 without the interior shell.
Figure 6:
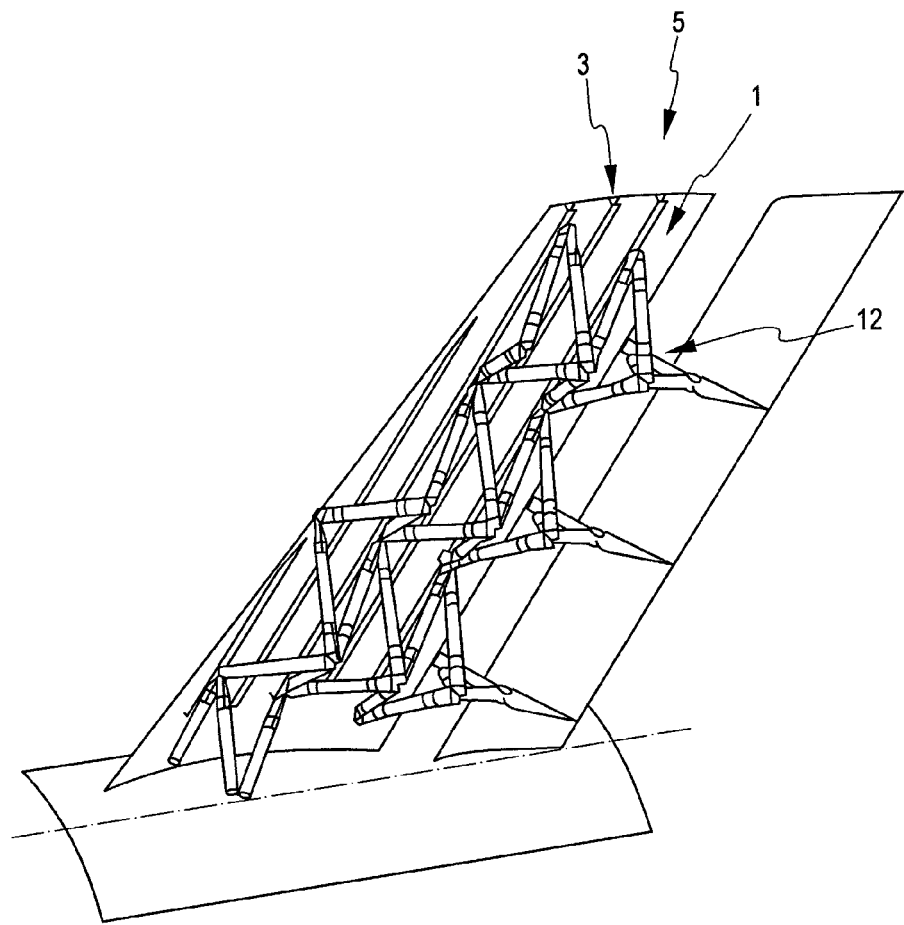
FIG. 6 shows a further perspective cross sectional view of a wing with a support structure according to an exemplary embodiment of the present invention.

FIGS. 4 to 6 show further perspective views of a wing, in particular of a vertical tail unit. The respective diagrams show the design of a vertical tail unit and of a control surface or rudder. The figure shows the manner in which the rudder 11 is held to the vertical tail unit by the control surface brackets 12. As a result of the rudder 11 additional weight arises that has to be borne by the support structure 7, the interior shell 2 and the exterior shell 1 as well as by the bracket 4.

Figure 7:
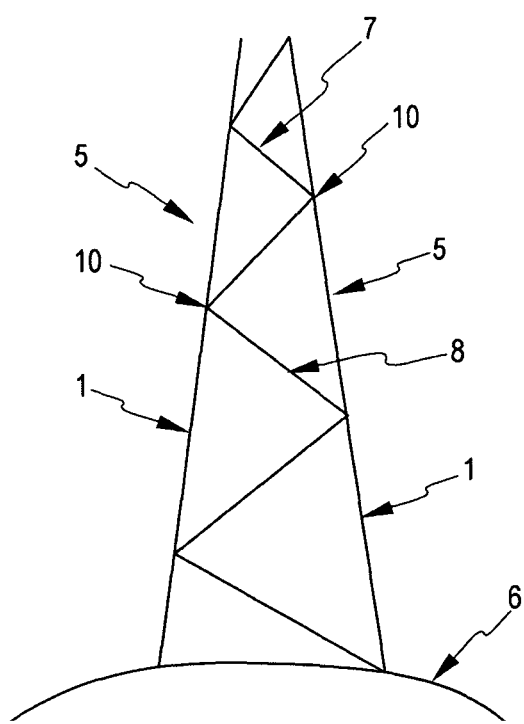
FIG. 7 shows a partial front view of a section of a vertical tail unit according to an exemplary embodiment of the present invention.

FIG. 7 shows a diagrammatic partial front view of a section of a vertical tail unit of an aircraft. Two lateral surfaces 5 provide the vertical tail unit with a flat structure that extends into the drawing plane. The two lateral surfaces 5 form a first shell around the framework 7. With the aircraft moving out of the drawing plane, air can flow past the lateral surfaces 5. FIG. 7 shows two lateral surfaces 5 that form an exterior shell 1. At the junction points or node points 10 the lateral surfaces 5 are connected to the framework 7. In this way the junction points or node points 10 determine the shape of the vertical tail unit. The framework 7 is covered by the lateral surfaces 5 so that the framework 7 can be used as framing for the lateral surfaces 5. The framework 7 supports the lateral surfaces 5.

FIG. 7 shows two individual lateral surfaces 5 that are arranged on the sides of the framework 7. However, the exterior shell 1 can also be designed as a continuous element, wherein the upper region of the vertical tail unit, which region, in the diagram, is shown to be open, is closed and is also covered by the exterior shell 1.

Between the two surfaces 5 essentially a hollow space is formed that comprises the framework 7. It may therefore be possible to design a light weight vertical tail unit. Forces that act on the lateral surfaces 5 in the direction of the hollow space are transferred to the fuselage 6 of the aircraft, by way of the framework 7, in the interior of the vertical tail unit in a straight line. In order to introduce the forces that have been transferred from the lateral surfaces 5 and/or the framework 7 are/is connected to the fuselage 6 of the aircraft. The connection can, for example, be established by bolt connections (not shown in FIG. 7). The framework 7 is connected to the bottom region of the fuselage 6 or only to the lateral surface 5. In the former case a force is introduced, by way of the framework 7, directly to the bottom region of the aircraft fuselage 6, while in the latter case a force is introduced by the framework 7, to the lateral surface 5 and, by way of the lateral surface 5, to the fuselage 6, e.g., to the bottom region of the fuselage 6.

Figure 8:
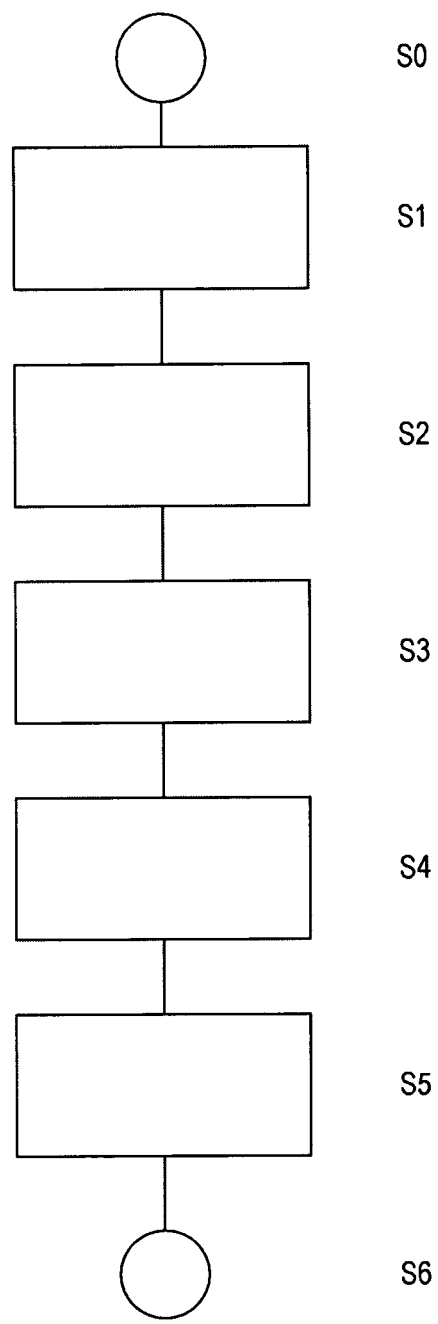
FIG. 8 shows the flow diagram of a method for the force transfer in a wing box.

FIG. 8 explains a method for transferring forces to a wing box of an aircraft wing. The method comprises the steps S0-S6. When implementing the method, after quitting the idle state S0 in step S1, a framework is connected to a first shell. The shell essentially envelops the framework. In addition, within the first shell a second shell can be provided, spaced apart from the first shell. The placement of an interior shell is shown in step S2.

The shape of the second shell can essentially correspond to the shape of the first shell.

In step S3 the framework is connected to the fuselage region of an aircraft such that a load that acts on the first shell can be transferred to the fuselage region of the aircraft by the framework. Absorption of a load by the first shell is shown in step S4. A load on the second shell can be caused by a load on the first shell, for example if the first shell and the second shell are connected to each other.

Before the method is completed, in step S6, the load that has been absorbed by the shells and has been distributed by way of the framework, in step S5, is introduced in a straight line to the fuselage area. In the fuselage area, supports that have been designed to absorb or transfer pressure loads and tensile loads can absorb and transfer the forces.

In addition it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. An aircraft wing assembly comprising a wing box and a fuselage region of an aircraft, wherein the wing box comprises:
    a framework comprising a plurality of junction elements and a plurality of tubular bar elements, the tubular bar elements being connected to each other at the end points with the corresponding junction elements;
    an exterior shell forming a hollow space comprising the framework; and
    an interior shell spaced apart from the exterior shell and enveloped by the exterior shell,
    wherein the interior shell is connected to the junction elements;
    wherein the exterior shell and the interior shell are connected to the fuselage region, such that a load is transferred from the exterior and interior shells to the fuselage region; and
    wherein the interior shell extends only partially over the exterior shell.

2. The aircraft wing assembly of claim 1, wherein the load is transferable in a straight line to a bottom region of the fuselage region by the framework.

3. A method for transferring forces from a wing box of an aircraft wing to a fuselage region of the aircraft, comprising:

providing an exterior shell and an interior shell at a distance from the exterior shell, wherein the interior shell extends only partially over the exterior shell and is enveloped by the exterior shell;

forming a hollow space with the exterior shell comprising a framework, the framework comprising a plurality of junction elements and a plurality of tubular bar elements, the tubular bar elements being connected to each other at the end points with the corresponding junction elements;

connecting the framework to the exterior shell and the interior shell, wherein the interior shell is connected to the junction elements;

connecting the exterior shell and the interior shell to the fuselage region;

absorbing a load from the exterior shell; and transferring the load to the fuselage region by the exterior shell, the interior shell and the framework.

4. The method of claim 3, further comprising transferring the load in a straight line to a bottom region of the fuselage with the framework.

* * * * *